(12) United States Patent
Chen

(10) Patent No.: US 11,636,486 B2
(45) Date of Patent: Apr. 25, 2023

(54) DETERMINING SUBSETS OF ACCOUNTS USING A MODEL OF TRANSACTIONS

(71) Applicant: PayPal, Inc., San Jose, CA (US)

(72) Inventor: Zhe Chen, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/440,149

(22) Filed: Jun. 13, 2019

(65) Prior Publication Data
US 2020/0394658 A1 Dec. 17, 2020

(51) Int. Cl.
*G06Q 20/40* (2012.01)
*G06F 16/904* (2019.01)

(52) U.S. Cl.
CPC ....... *G06Q 20/4016* (2013.01); *G06F 16/904* (2019.01)

(58) Field of Classification Search
CPC .......... G06Q 20/4016; G06Q 30/0201; G06Q 20/401; G06Q 30/0185; G06Q 30/00; G06Q 30/0609; G06Q 20/12; G06Q 30/0222; G06Q 20/227; G06Q 20/385; G06F 16/904
See application file for complete search history.

(56) References Cited

U.S. PATENT DOCUMENTS

| | | | | |
|---|---|---|---|---|
| 7,937,375 B2 * | 5/2011 | Wong | ................... | G06Q 40/00 707/696 |
| 10,938,853 B1 * | 3/2021 | Zablocki | ............... | G06F 16/906 |
| 2013/0024371 A1 * | 1/2013 | Hariramani | .......... | G06Q 20/384 705/41 |
| 2014/0012738 A1 * | 1/2014 | Woo | ..................... | G06Q 20/384 705/39 |
| 2015/0264063 A1 * | 9/2015 | Jenson | ................ | H04L 63/1408 726/22 |
| 2017/0186009 A1 * | 6/2017 | Zolli | ................... | G06Q 20/4016 |
| 2019/0378050 A1 * | 12/2019 | Edkin | ................ | G06Q 30/0185 |
| 2019/0378051 A1 * | 12/2019 | Widmann | .......... | G06Q 30/0185 |
| 2020/0169483 A1 * | 5/2020 | Kursun | ............... | H04L 63/1408 |
| 2020/0265092 A1 * | 8/2020 | Zhu | ..................... | G06F 16/9035 |

OTHER PUBLICATIONS

Lafferty, John, Han Liu, and Larry Wasserman. Directed Graphical Models. 2010 (Year: 2010).*
Newman, M.E.J. "Modularity and Community Structure in Networks." PNAS. Department of Physics and Center for the Study of Complex Systems, University of Michigan. Jun. 6, 2006 (Year: 2006).*

(Continued)

*Primary Examiner* — Elda G Milef
(74) *Attorney, Agent, or Firm* — Kowert, Hood, Munyon, Rankin & Goetzel, P.C.; Gentry C. McLean; Dean M. Munyon

(57) ABSTRACT

A computer system receives a first set of information that describes a set of transactions between pairs of user accounts of a service and a second set of information that specifies attribute values for user accounts of the service that are recipient user accounts within the set of transactions. Using the first set of information and the second set of information, the computer system generates an augmented graph model of the transactions and attribute values. By applying modularity maximization to the augmented graph model, the computer system determines a plurality of subsets of recipient user accounts.

20 Claims, 9 Drawing Sheets

(56) References Cited

OTHER PUBLICATIONS

Lu, Xiaoyan, Konstantin Kuzmin, Minming Cheu, Boleslaw K. Szymanski. "Adaptive Modularity Maximization via Edge Weighting Scheme." Journal of Information Sciences, Oct. 10, 2017 (Year: 2017).*
Yiye Ruan, et al., "Efficient Community Detection in Large Networks using Content and Links," International World Wide Web Conference Committee (IW3C2) May 13-17, 2013, pp. 1089-1098.
Schölkopf et al., "Nonlinear Component Analysis as a Kernel Eigenvalue Problem," Technical Report No. 44, Max-Planck-Institut für biologische Kybernetik, 1996—Sungsu Lim Mar. 8, 2011, 18 pages.
Zhu et al., "Learning from Labeled and Unlabeled Data with Label Propagation," School of Computer Science, Carnegie Mellon University, Jun. 2002, 8 pages.
Blondel et al., "Fast unfolding of communities in large networks," J. Stat. Mech. (2008), 12 pages.
Phillips et al., "A Gentle* Introduction to the Kernel Distance," https://arxiv.org/abs/1103.1625v2; Mar. 11, 2011, 9 pages.
Ruan et al., "Efficient Community Detection in Large Networks using Content and Links," https://arxiv.org/abs/1212.0146v1; Dec. 4, 2012, 21 pages.
Yang et al., "Community Detection in Networks with Node Attributes," https://arxiv.org/abs/1401.7267v1; Jan. 28, 2014, 10 pages.
Maekawa et al., "Non-linear Attributed Graph Clustering by Symmetric NMF with PU Learning," Association for the Advancement of Artificial Intelligence, 2018, 8 pages.
Sen et al., "Collective Classification in Network Data," Articles, Association for the Advancement of Artificial Intelligence, Fall 2008, pp. 93-106.
Shiokawa et al., "Fast Algorithm for Modularity-Based Graph Clustering," Proceedings of the Twenty-Seventh AAAI Conference on Artificial Intelligence, 2013, pp. 1170-1176.
Cai et al., "Multi-View K-Means Clustering on Big Data," Proceedings of the Twenty-Third International Joint Conference on Artificial Intelligence, 2013, pp. 2598-2604.
Girvan et al., "Community structure in social and biological networks," PNAS, Jun. 11, 2002, vol. 99, No. 12, pp. 7821-7826.
Newman, "Modularity and community structure in networks," PNAS, Jun. 6, 2006, vol. 103, No. 23, pp. 8577-8582.
Newman, "Detecting community structure in networks," Eur. Phys. J. B 38, 321-330 (2004).
Szczepanski et al., "The Game-Theoretic Interaction Index on Social Networks with Applications to Link Prediction and Community Detection," Proceedings of the Twenty-Fourth International Joint Conference on Artificial Intelligence (IJCAI 2015), pp. 638-644.
Jia et al., "Node Attribute-enhanced Community Detection in Complex Networks," published online May 25, 2017 Scientific Reports | 7: 2626 | DOI:10.1038/s41598-017-02751-8, 15 pages.
Dev, "A user interaction based community detection algorithm for online social networks," SIGMOD/PODS'14, Jun. 22-27, 2014, 2 pages.
Shao et al., "Community Detection based on Distance Dynamics," KDD'15, Aug. 10-13, 2015, pp. 1075-1084.
Mahmood et al., "Subspace Based Network Community Detection Using Sparse Linear Coding," Article in IEEE Transactions on Knowledge and Data Engineering—Nov. 2015, 11 pages.
Geyer-Schulz et al., "The Randomized Greedy Modularity Clustering Algorithm and the Core Groups Graph Clustering Scheme," Springer International Publishing Switzerland 2014, pp. 14-36.
Rattigan et al., "Graph clustering with network structure indices," Appearing in Proceedings of the 24th International Conference on Machine Learning, Jan. 2007, 8 pages.
Huang, "Extensions to the k-Means Algorithm for Clustering Large Data Sets with Categorical Values," Data Mining and Knowledge Discovery 2, 283-304 (1998), pp. 283-304.

Lim et al., "BlackHole: Robust Community Detection Inspired by Graph Drawing," ICDE 2016 Conference, pp. 25-36.
Barbieri et al., "Influence-based Network-oblivious Community Detection," Conference: ICDM 2013, 6 pages.
Dang et al., "Community Detection based on Structural and Attribute Similarities," ICDS 2012 : The Sixth International Conference on Digital Society, pp. 7-12.
Arthur et al., "k-means++: The Advantages of Careful Seeding," SODA '07: Proceedings of the eighteenth annual ACM-SIAM symposium on Discrete algorithms, Jan. 2007, pp. 1027-1035.
Huang, "Clustering large data sets with mixed numeric and categorical values," In The First Pacific-Asia Conference on Knowledge Discovery and Data Mining, 1997, 14 pages.
Liu et al., "Community Detection Based on Structure and Content: A Content Propagation Perspective," 2015 IEEE International Conference on Data Mining, pp. 271-280.
Prat-Pérez et al., "High Quality, Scalable and Parallel Community Detection for Large Real Graphs," WWW'14, Apr. 7-11, 2014, pp. 225-235.
Falih et al., "Community detection in Attributed Network," Track: Mining Attributed Networks, WWW 2018, Apr. 23-27, 2018, pp. 1299-1306.
Sanchez et al., "Efficient Algorithms for a Robust Modularity-Driven Clustering of Attributed Graphs," Proceedings of the 2015 SIAM International Conference on Data Mining, 9 pages.
Zhou et al., "Graph Clustering Based on Structural/Attribute Similarities," VLDB '09, Aug. 2428, 2009, 12 pages.
Wang et al., "Community detection in attributed networks based on heterogeneous vertex interactions," Appl Intell (2017) 47:1270-1281.
Huang et al., "Consensus and Multiplex Approach for Community Detection in Attributed Networks," 2016 IEEE GlobalSIP, pp. 425-429.
Shen et al., "Compressed K-Means for Large-Scale Clustering," Proceedings of the Thirty-First AAAI Conference on Artificial Intelligence (AAAI-17), Feb. 2017, pp. 2527-2533.
Li et al., "Community Detection in Attributed Graphs: An Embedding Approach," The Thirty-Second AAAI Conference on Artificial Intelligence (AAAI-18), last modified Apr. 25, 2018, pp. 338-345.
Ester et al., "A Density-Based Algorithm for Discovering Clusters; A Density-Based Algorithm for Discovering Clusters in Large Spatial Databases with Noise," KDD-96 Proceedings, Aug. 1996, pp. 226-231.
Yamaguchi et al., "When Does Label Propagation Fail? A View from a Network Generative Model," Proceedings of the Twenty-Sixth International Joint Conference on Artificial Intelligence (IJCAI-17), Aug. 2017, pp. 3324-3230.
Bian et al., "Many Heads are Better than One: Local Community Detection by the Multi-Walker Chain," Nov. 18-21, 2017 IEEE International Conference on Data Mining (ICDM), 10 pages.
Singh et al., "Application of Graph Theory in Computer Science and Engineering," International Journal of Computer Applications (0975-8887) vol. 104—No. 1, Oct. 2014, pp. 10-13.
Coimbra et al., "An analysis of the graph processing landscape," Journal of Big Data vol. 8, Article No. 55 (2021); https://journalofbigdata.springeropen.com/articles/10.1186/s40537-021-00443-9; 41 pages.
Elyasi et al., "Large-Scale Graph Processing on Emerging Storage Devices," Proceedings of the 17th USENIX Conference on File and Storage Technologies (FAST '19), Feb. 25-28, 2019; https://www.usenix.org/system/files/fast19-elyasi.pdf; pp. 309-316.
Juan M. Tirado, "Graph processing: a problem with no clear victor," Oct. 14, 2020; https://towardsdatascience.com/graph-processing-a-problem-with-no-clear-victor-3683c483f5dc; 4 pages.
"Forget Moore's Law. Algorithms drive technology forward," Mar. 24, 2021, https://stackoverflow.blog/2021/03/24/forget-moores-law-algorithms-drive-technology-forward/, 18 pages.
"Research finds out that improved algorithms are more important than hardware," Sep. 21, 2021, https://softwaretesting.news/research-finds-out-that-improved-algorithms-are-more-important-than-hardware/, 1 page.

(56) References Cited

OTHER PUBLICATIONS

"Algorithmic efficiency," https://en.wikipedia.org/wiki/Algorithmic_efficiency, retrieved Mar. 7, 2022, Wikipedia, 10 pages.

* cited by examiner

DETERMINING SUBSETS OF ACCOUNTS USING A MODEL OF TRANSACTIONS

BACKGROUND

Technical Field

This disclosure relates generally to analyzing transactions between user accounts of a service to determine subsets of user accounts of the service.

Description of the Related Art

With the advent of large-scale computer storage capacity, it has become possible to store massive amounts of information about how a computer-implemented service is used. For example, if a service facilitates transactions between user accounts of the service, information about these user accounts and records of these transactions can be stored for analysis. Taken together, information about various user accounts and the transactions between these user accounts can be analyzed to derive insights into the security and performance of the service.

SUMMARY

The present disclosure concerns analyzing information concerning transactions between user accounts of a service and attribute information of some of the user accounts of the service to generate a model, and in turn using the model to determine subsets of user accounts. In various instances, these subsets include user accounts that share characteristics that may be useful in various applications including network security, risk management, compliance management, and targeted marketing. Identifying subsets with useful shared characteristics, however, is a complex task because the scope of the network may be complex, the attribute information may be in multiple data types and have missing information, the subset detection process is unsupervised, and topological information about the network may provide contradictory information with the attribute information The techniques disclosed herein are useable to determine subsets of user accounts from large-scale attributed graph models using a framework named Augmented Graph with Modularity Maximization and Refinement (AGGMMR). In various embodiments, the AGGMMR framework partitions an augmented graph model based on both its attributes and topological information through a greedy modularity maximization algorithm. AGGMMR consists of three phases: (i) augmented graph construction and weight initialization, (ii) weight learning with modularity maximization, and (iii) modularity refinement.

Figure 1:
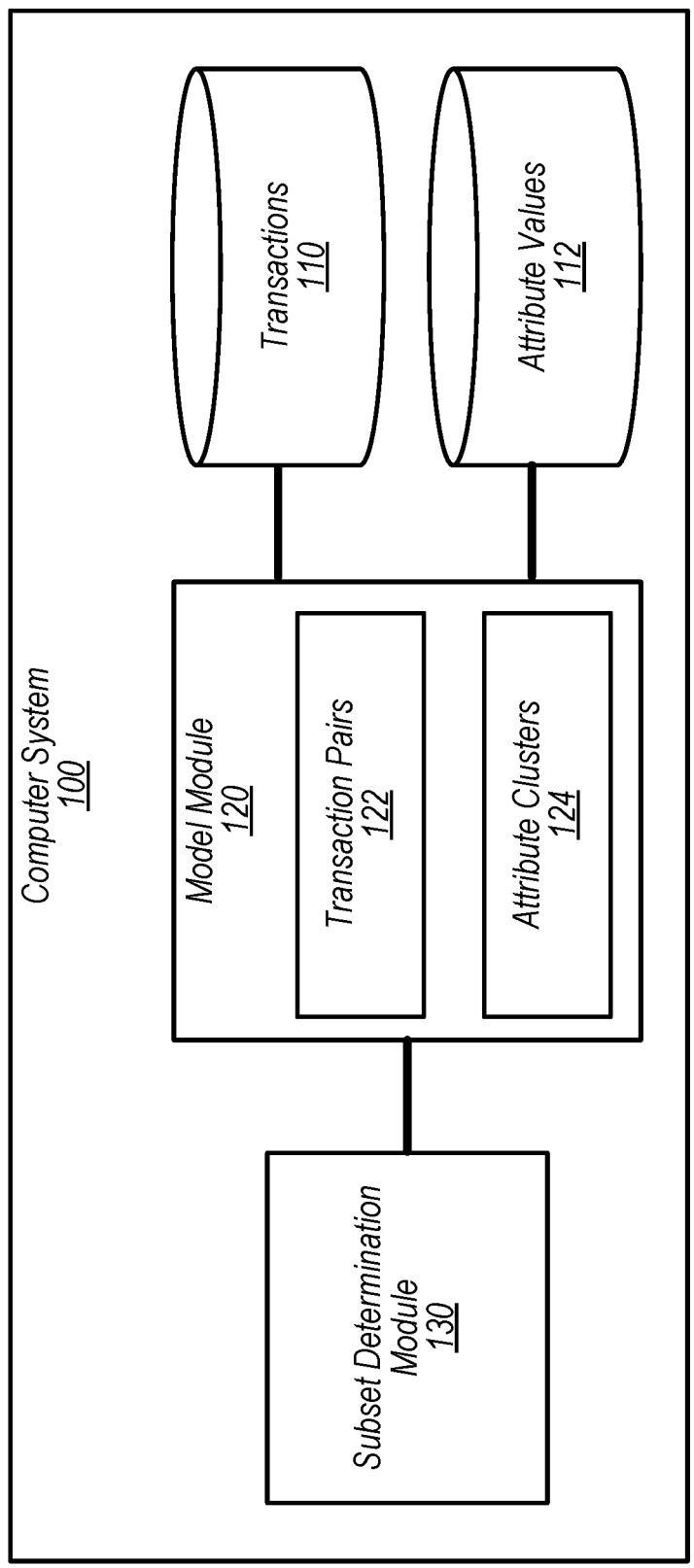
FIG. 1 is a block diagram illustrating an embodiment of a computer system configured to determine subsets of accounts using a model of transactions in accordance with the disclosed embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to generate a model" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" nodes would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Many computer-implemented services record voluminous data about the users of such computer-implemented services, these users' transactions with the computer-implemented services, and/or these users' transactions with each other. Analyzing this voluminous data may reveal important insights about the performance of the computer-implemented service, the users, or their transactions with each other. Because the amount of data can be so large, in various embodiments, the techniques used process this data balance the speed at which the data is processed and the amount of computer resources utilized against qualities of the resulting analysis.

In various embodiments, from among the various users (and their respective accounts), a computer system may be able to analyze the data about the users and their transactions to identity subsets of user accounts that include user accounts that share characteristics. In some instances, such characteristics may be characteristics of the user (e.g., one subset may include user accounts for users that are corporate entities, another subset may include user accounts for users that are natural people), characteristics of the user accounts (e.g., one subset may include user accounts that are accessed on a daily basis, another subset may include user accounts that are used more infrequently), and/or characteristics of the transactions between user accounts (e.g., one subset may include user accounts that engage in infrequent but large value transactions, another subset may include user accounts that engage in multiple transactions per day and are relatively smaller value). In a sense these subsets represent "communities" of user accounts. These community groupings may be useful in various applications including network security, risk management, compliance management, and targeted marketing.

For example, the computer-implemented service may use these community groupings (and, in embodiments, risk scores associated with the groupings) to detect unauthorized transactions (e.g., sales of contraband, sales with maliciously taken-over user accounts) and intercede (e.g., by preventing future transactions, by banning offending user accounts). In another example, members of a community that infrequently use the service but engage in large value transactions can be sent marketing messages to increase use of the service based on the community grouping. In still another example, a first community of users with brick-and-mortar stores may be assigned lower risk scores than a second community of users without brick-and-mortar stores, and the higher risk score of the second community may be used to flag transactions with members of the second community for additional scrutiny (e.g., against fraud, against sale of contraband).

Referring now to FIG. 1, a block diagram illustrating an embodiment of a computer system 100 configured to determine subsets of accounts using a model of transactions is depicted. Computer system 100 includes a database storing a transaction set 110, a database storing an attribute values set 112, a modeling module 120 executable to generate a model using transactions set 110 and attribute values set 112, and a subset determinization module 130 executable to determine subsets of nodes within the model generated by modeling module 120. In various embodiments, the database storing transaction set 110 and the database storing attribute values set 112 are separate as shown in FIG. 1, but in various embodiments, transaction set 110 and attribute values set 112 are maintained in the same database.

Transactions set 110 includes information that describes a set of transactions between pairs of user accounts of a service (e.g., a file storage service, a payment service). In various embodiments, such transactions are purchases in which monetary value is exchanged for a good or service in the context of a marketplace or payment service. In other embodiments, however, transactions can be any exchange between accounts including but not limited to exchanges of files in a file storage service or exchanges of messages in an electronic mail service. Each transaction is between a pair of user accounts that includes an "initiator user account" (i.e., the user account associated with the entity that starts the transaction) and a "recipient user account" (i.e., the user account associated with the entity that responds to the transaction). For example, in various embodiments, initiator user accounts are buyer user accounts, the recipient user accounts are seller user accounts, and each transaction corresponds to a purchase between a given buyer user account and a given seller user account.

Attribute values set 112 includes information that specifies attribute values for user accounts of the service that are recipient user accounts within transaction set 110. In various embodiments, such attribute values describe aspects of a given recipient account or the entity that is associated with the given recipient account (e.g., a business, an individual, etc.). In various embodiments, recipient accounts describe location or business region of the entity, number of employees working for the entity, the corporate form of the entity, whether the entity has taken out a loan, what kinds of products or services the entity is offering, the last time the recipient account was accessed, the last time a transaction was made with the recipient account, the average time between accesses of the recipient account, the average time between transactions made with the recipient account, whether the recipient account has acted as an initiator account in other transactions, etc. In various embodiments, only a subset of recipient accounts has associated attribute values in attribute values set 112. In some of such embodiments, no initiator accounts have attribute values in attribute values set 112, although in other embodiments, when initiator accounts in first transactions can also be used as recipient accounts in second transactions and have associated attribute values in attribute values set 112. Moreover, in various embodiments, not all of the recipient accounts that have attribute values in attribute values set 112 have the same set of attribute values. For example, in various instances small entities (e.g., single proprietorships) and larger entities (e.g., corporations) have respective recipient accounts but only larger entities have attribute values describing the entity associated with the recipient account. In other embodiments, recipient accounts associated with small entities have no attribute values in attribute values set 112.

Figure 2:
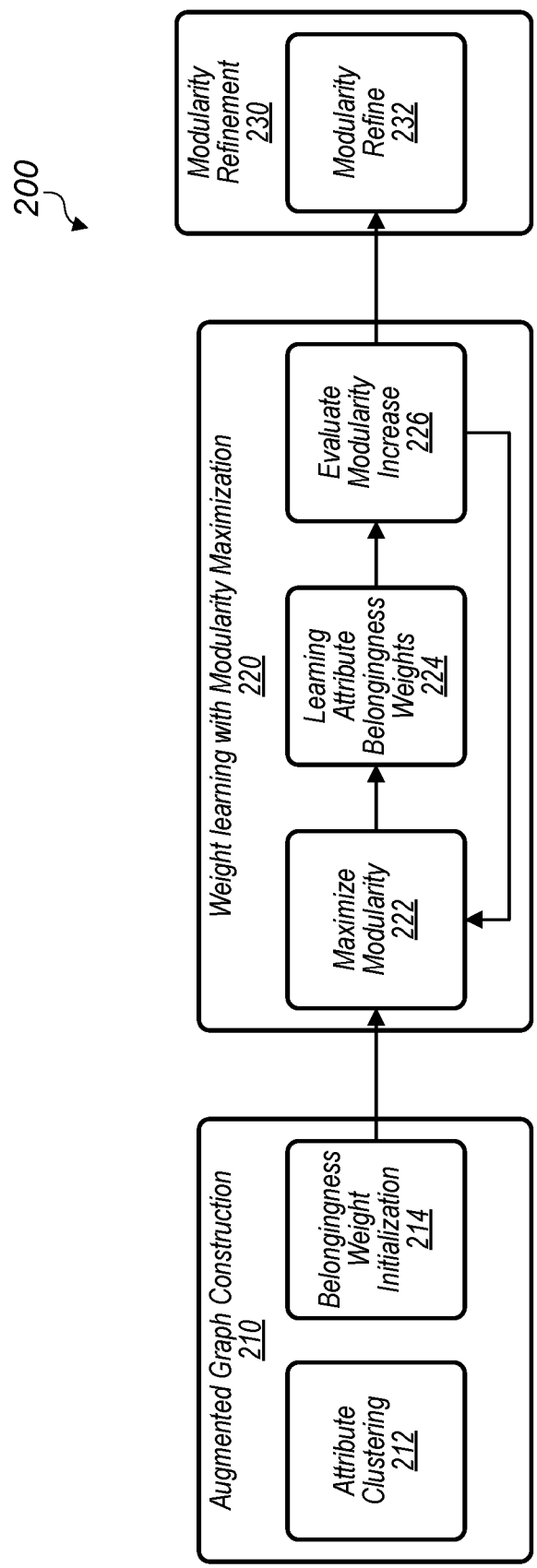
FIG. 2 is a flowchart depicting an embodiment of an account subset determining method 200 is shown.

As discussed in further detail herein in reference to FIG. 2, such attribute values in attribute values set 112 may be recorded as different data types (e.g., attribute values may be numerical, categorical, many-value, or multi-value). Accordingly, in various embodiments, heterogenous sets of attribute values are associated with only a subset of recipient user accounts in transactions set 110. These user accounts that are associated with attribute values are also referred to herein as "attributed user accounts" and when such attributed user accounts are represented by nodes in an augmented graph model discussed herein, such nodes are also referred to herein as "attributed nodes." In the dataset used by the inventor, for example, transaction set 110 recorded 1.5 billion transactions between 100 million different user accounts, 3 million of which were described by 68 attribute values in attribute values set 112.

Modeling module 120 is useable to generate an augmented graph model of the transactions in transactions set 110 that retains the attribute values of attribute values set 112. In various embodiments, the augmented graph model represents a plurality of transaction pairs 122 from transaction set 110 as respective nodes connected by edges and uses attribute clusters 124 represented in the augmented graph model using center point nodes to represent attribute values. As discussed herein in additional detail with reference to FIG. 2, each transaction in transaction set 110 is between a pair of user accounts: an initiator user account and a recipient user account. These user accounts are represented in the augmented graph model as nodes (also referred to herein as "vertices") with edges representing transactions between the pair of nodes associated with the transaction. In various embodiments and discussed in further detail with reference to FIG. 2, modeling module 120, using transactions set 110, generates a graph model (i.e., a graph model that is not augmented) specifying nodes representing user accounts and the set of transactions as edges between pairs of nodes. Then, modeling module 120 augments such a graph model with attribute values from attribute values set 112 by identifying a plurality of attribute clusters 124 among attributed nodes of the graph model, representing the attribute clusters 124 in the augmented graph model as center point nodes (also referred to herein as "vertices"), and connecting each center point nodes to the attributed nodes clustered in its respective attribute cluster 124.

In various embodiments, subset determination module 130 determines, using the augmented graph model, a plurality of subsets of recipient user accounts. As discussed above, in various instances, these subsets include user accounts that share characteristics. In a sense, a particular subset of attributed nodes (and therefore attributed user accounts) belong to a "community" because of they are grouped in the same subset. These community groupings may be that useful in various applications including network security, risk management, compliance management, and targeted marketing. In various embodiments, subset determination module 130 uses modularity maximization applied to the attributed nodes in a sequence to make a first grouping of the attributed nodes into subsets of user accounts and then refine the first grouping to make a second grouping in which some attributed nodes are resorted into revised subsets of user accounts. In various embodiments, the subset determination module 130 and modeling module 120 adjust attribute edges as part of the first grouping, and the adjusted attribute edges are used in further groupings in the first grouping and in the second grouping.

The techniques described herein enable determination of subsets (also referred to herein as community detection) from among large scale augmented graph networks. These techniques are able to utilize both the topological information of the augmented graph network as well as attribute values (represented in embodiments in the augmented graph network as additional nodes). These techniques, unlike previous augmented graph analysis techniques, are able to scale and analyze large networks (e.g., at least on the scale of 100 million user accounts and 1.5 billion transactions), analyze networks containing heterogenous nodes (e.g., nodes without attributes and attributed nodes, and attributed nodes with different numbers of attribute values) and different types of attribute values. After determining these subsets of user accounts, computer system 100 is able to flag the recipient user accounts in a particular subset for review (e.g., to determine whether these user accounts pose a security risk or compliance risk to the network), send messages to the recipient user accounts in a particular subset (e.g., marketing messages, warnings about security risks or compliance risks). In some embodiments, computer system is able to assign respective risk scores to one or more over the subsets and, based on the risk scores, evaluate transactions (e.g., past transactions in transaction set 110 or incoming transactions) associated with one or more user accounts in the subsets.

Referring now to FIG. 2, a flowchart depicting an embodiment of an account subset determining method 200 is shown. In the embodiment shown in FIG. 2, the various actions associated with method 200 are implemented by computer system 100. In various embodiments, the AGGMMR framework shown in method 200 is designed to partition an attributed graph based on its attributes and topological information, through a greedy modularity maximization model. In various embodiments, method 200 includes three phases: an augmented graph construction phase 210, a weight learning with modularity maximization phase 220, and a modularity refinement phase 230.

In various embodiments discussed herein, in augmented graph construction phase 210, an augmented graph model is constructed using attributed clustering to retain attribute relationships between vertices. Attribute relationships are then transformed into edges in the augmented graph model. In weight learning with modularity maximization phase 220, modularity maximization is used to partition the augmented graph model—which now contains both attributes and topological information—into subsets of vertices. Along with the partitioning, weights on those attribute relationships according to their contributions toward partitioning the vertices into subsets. In modularity refinement phase 230, a greedy search technique is used to optimize the result of phase 220 and reduce the effect of processing order on the partitioning.

In augmented graph construction phase 210, transactions set 110 and attribute values set 112 are used to generate an augmented graph model that includes both attribute information and topological information. In various embodiments, a graph model can be constructed that represents transaction set 110 as a group of nodes representing the user accounts and edges between the nodes representing transactions between user accounts. In various embodiments, the graph model can be augmented to retain information from the attribute values set 112. In some embodiments, all of the values of the attribute values set 112 can be plotted on the graph model and with additional nodes and then be connected to the original nodes to create an augmented graph model. For example, if there are 100 attributes each with 10 different values in a graph model consisting of 1,000,000 vertices, this method will generate 100×10 additional vertices and 100×1M additional edges.

In other embodiments, instead of directly using attribute values as additional values, a number of attribute clusters can be identified using attribute values set 112, a center point of each attribute cluster can be identified, the center points of each attributed cluster 124 can be represented in the graph model using a center point node, and attribute edges connect the center point nodes to their member vertices to retain the attribute relationships and to thereby generate the augmented graph model. Using this technique, the attributed values set 112 is summarized in the augmented graph model without having to plot each attribute value individually. In various instances, the result is that fewer additional nodes and edges are added to the augmented graph model, which conserves computer processing and memory utilization. For example, if there is a graph model with 1,000,000 vertices and 10,000 attribute clusters, only 10,000 additional vertices and at most 1,000,000 attribute edges are needed to construct an augmented graph model. Accordingly, useful attribute relationships are effectively captured in this much smaller augmented graph. Moreover, as discussed herein, this technique is also not limited to generating an augmented graph model that only includes categorical attributes. Instead, this technique can be used with all types of attributes as long as the attributes are available for clustering (e.g., numerical attributes clustered using k-means clustering, categorical attributes clustered using k-prototype clustering as discussed herein, attributes that are in a format useable by a clustering algorithm as a parameter). Moreover, this technique is compatible with all kinds of center-based attribute clustering algorithm, and not merely the techniques disclosed herein.

At block 212, computer system 100 performs attribute clustering. In various embodiments, a clustering algorithm such as k-means clustering (or k-prototype clustering discussed herein) can be applied to cluster attributed nodes (i.e., nodes representing user accounts for which attribute information is included in attribute values set 112) into a number of attribute clusters. In various embodiments, other clustering algorithms than k-means or k-prototype can be used, including but not limited to mean-shift clustering, Expectation-Maximization (EM) Clustering using Gaussian Mixture Models (GMM), singular value decomposition, Density-Based Spatial Clustering of Applications with Noise (DB-SCAN), and Agglomerative Hierarchical Clustering. In various embodiments, the number of attribute clusters can be set manually, or automatically (e.g., based on the number of attributed user accounts in attribute values set 112). In various embodiments, these attributed nodes are clustered into the number of attribute clusters in a manner that reduces variance between the attributed nodes in the same cluster. In various embodiments, the clustering algorithm identifies, for each respective attribute cluster, a center point that is the centroid of the various nodes in that attribute cluster. The center point of each attribute cluster is then represented in the graph model using a center point node. Then, the attribute nodes in each respective attribute 124 cluster are connected to the center point node for the respective cluster with an attribute edge. The attribute edge weight for this attribute edge is discussed herein in connection to block 214.

Figure 3:
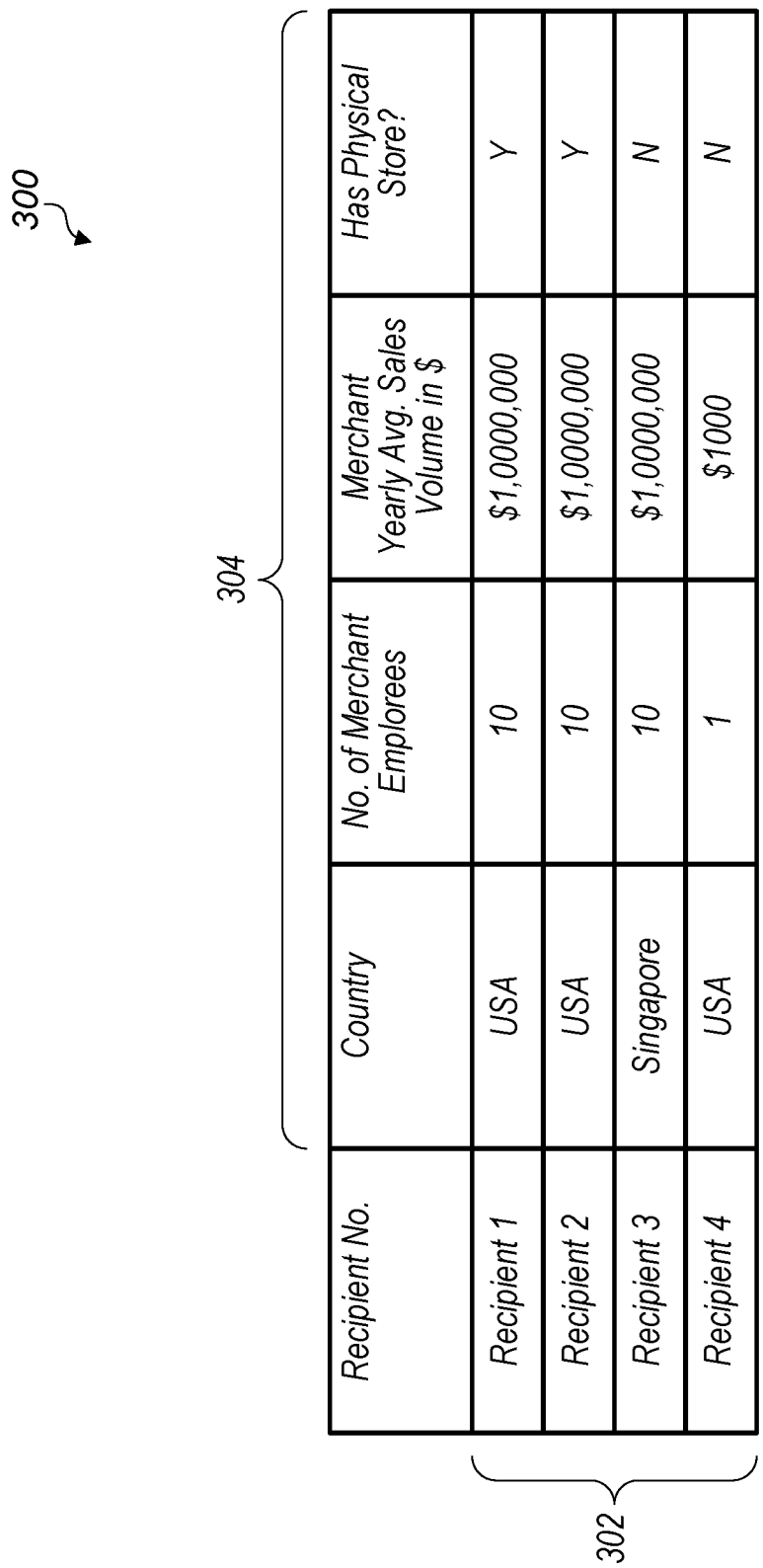
FIG. 3 is an exemplary table of recipient user accounts in accordance with the disclosed embodiments.

Referring now to FIG. 3, a simplified attribute values set 112 is shown represented as a table 300. As shown in FIG. 3, table 300 includes four recipient user accounts 302, each having four attribute values 304, although in other embodiments, there may be many ore recipient user accounts and attribute values (e.g., millions of recipient user accounts and dozens of attribute values). As discussed herein, these attribute values are clustered using one or more clustering algorithms and the recipient user accounts are grouped with the nearest cluster. Applying the techniques described above in connection to block 212 using table 200 as attribute values set 112, these four recipient user accounts 302 will be clustered into K groups. Assuming that K=3 here (this number can be manually set or determined automatically as discussed herein), these merchants will be clustered into three attributed clusters. For example, after k-means clustering (or k-prototype clustering) the attributed notes representing Recipient 1 and Recipient 2 are clustered into attribute cluster A, the attributed node representing Recipient 3 is clustered into attribute cluster B, and the attributed node representing Recipient 4 is clustered into attribute cluster C. Then, the center point nodes representing the center of each of attribute cluster A, B, and C are added to a graph model generated with transaction set 110. Then, the attributed nodes representing Recipient 1 and Recipient 2 are connected to the center point node for attribute cluster A with attribute edges, the attributed node representing Recipient 3 is connected to the center point nodes for attribute cluster B with an attribute edge, and the attributed node representing Recipient 4 is connected to the center point node for attribute cluster C, resulting in the augmented graph model for transaction set 110 and attributed values set 112. In various embodiments, each attributed node is only connected to a single center point node.

At block 212, computer system 100 performs attribute edge weight initialization. Once the center point nodes for the attribute clusters are added to the graph model, the attributed nodes in the respective attribute clusters are connected to the center point node for that cluster by an attributed edge having an attribute edge weight. To indicate the strength of relationship between each node and its nearest attribute center point node, attribute distance is used to initialize the weight of the attribute edge. In various embodiments, attribute distance is the distance between each vertex and their nearest attribute center point node, calculated by the center-based attribute clustering algorithm. In some embodiments, for example, Euclidean distance can be used if a k-means algorithm is used to cluster attribute values. Herein, attribute distance is denoted by $d(v_i, v_c)$ between vertex $v_i$ and attribute center $v_c$.

In various embodiments, Euclidean distances are calculated as attribute distances, and then mapped into probability values. More particularly, Euclidean distances can be mapped into higher dimensional space using the radial basis function (RBF) kernel kernel shown in Equation 1:

$$P(v_i, v_c) = \exp\left(\frac{-d(v_i, v_c)}{2\sigma^2}\right) \qquad \text{Equation 1}$$

As the kernel distance embeds isometrically in a Euclidean space, the RBF kernel function is an effective metric for weighting observations in various embodiments. Then the weight initialization on attribute edges are calculated using Equation 2:

$$w(v_i, v_c) = dt(v_i) \times P(v_i, v_c) \qquad \text{Equation 2}$$

Here, $dt(v_i)$ is the weighted degree of vertex $v_i$ in the graph model (i.e., the original graph before adding attribute centers as additional vertices). This weighting scheme is designed to balance the weights between attribute information and topological information for each vertex in the augmented graph at the initial stage in various embodiments.

Referring again to FIG. 2, in weight learning with modularity maximization phase 220, computer system 100 analyzes the augmented graph model generated in augmented graph construction phase 210. As discussed herein, in the augmented graph, both topological relationships (e.g., transactions between nodes) and attribute values (e.g., center point nodes connected to attributed nodes by attribute edges) are represented by edges. Accordingly, in phase 220, computer system 100 could employ any suitable topological based clustering method to partition the augmented graph. Intuitively, densely connected vertices should be in a community as they share either strong attributes or strong topological relationships, or both. In various embodiments, computer system 100 employs modularity maximization in phase 220 to partition the graph as discussed below. In such embodiments, determining the plurality of subsets using modularity maximization is performed such that each of the attributed nodes is grouped in the subset of recipient user accounts that maximizes modularity gain over entire the augmented graph model.

At block 222, computer system 100 performs a modularity maximization to sort attributed nodes into communities based on both the topological relationships and attributes. In various embodiments, Equation 3 below is employed at block 222:

$$Q = \frac{1}{2m} \sum_{ij} \left[ A_{ij} - \frac{da(v_i) \times da(v_j)}{2m} \right] \delta(v_i, v_j) \quad \text{Equation 3}$$

In Equation 3, Q is the modularity, m corresponds to the cardinality of edges in the augmented graph model, $da(v_i)$, $da(v_j)$ are the weighted degrees of vertices $v_i$ and $v_j$ in the augmented graph model, respectively. $A_{ij}$ is the ij-th component of the adjacency matrix of the augmented graph model, and $A_{ij}$ equals to edge weight if vertices $v_i$ and $v_j$ are adjacent, and 0 otherwise. $\delta(v_i, v_j)$ equals to 1 when $v_i$ and $v_j$ belongs to the same community, and to 0 otherwise.

In various embodiments, the Louvain algorithm for modularity maximization is used. In such embodiments, at the beginning of modularity maximization, each vertex is assigned with an individual community. In every iteration, each vertex is compared with its neighbors' community assignments, and assigned to the one with maximum modularity gain. The computation of modularity gain is based on the weights of the edges.

In various embodiments, at block 222 vertices are partitioned on both attributes and topological relationships. Since both types of relationships are represented by edges, there are three situations in which two vertices are assigned a same community through modularity maximization: (i) They are densely connected and they have strong attribute relationships. (ii) They are densely connected but they have trivial attribute relationships. (iii) They are not densely connected but their attribute relationships are strong enough to connect them.

At block 224, computer system 100 performs a learning algorithm to learn the attribute edge weights. In various instances, some attribute relationships could be trivial for many communities. Accordingly, minimizing the influence from such trivial attribute relationships and increasing the importance of meaningful attribute relations improves the performance of method 200 in various embodiments. To this end, an unsupervised weight learning algorithm that is aligned with the modularity maximization objective can be employed to automatically adjust the weights for attribute relationships according to their contributions in the clustering in various embodiments.

For example, if most vertices from a first attribute cluster 124 have been assigned to the same community in an iteration, then this attributed-based relationship from the first attribute cluster 124 provides positive contribution to the community detection task. In contrast, if most of the vertices from a second attribute cluster 124 have been assigned to a large number of different communities, then this attribute-based relationship is very weak and might introduce noise to our task. The weights of attribute edges to the center point nodes for these attribute clusters 124 therefore can be adjusted accordingly. In various embodiments, to update weights of attribute edges, clustering contribution score is calculated for each respective attribute cluster 124 as represented by that attribute cluster's center point node. In such embodiments, each of these contribution scores is respectively indicative of a contribution of the respective attribute cluster 124 to the determining of the plurality of subsets of recipient user accounts relative to other attribute clusters. As discussed below, a given contribution score is then useable to adjust the attribute edge weights for attributed nodes connected to the center point node corresponding to the given contribution score. In various embodiments, the contribution score for an attribute cluster 124, denoted by $\Theta_a$ is calculated through Equation 4:

$$\Theta_a |V_a / C_a|. \quad \text{Equation 4}$$

In Equation 4, $V_a$ is the set of vertices that connect to this attribute center; $C_a$ is the set of communities that the member vertices in $V_a$ are assigned to through modularity maximization in the current iteration. The value of $\Theta_a$ is bounded between 1 to $|V_a|$ as $|C_a|$ varies from 1 to $|V_a|$. The more vertices an attribute cluster 124 connects, the higher potential contributions this attribute cluster 124 will have. That is, an attribute cluster 124 connecting to 10,000 vertices and all its vertices distributed in the same community contributes more than an attribute center who connects only 10 vertices in the same situation.

To meet the constraint that the total edge weights does not change, $\sum_{i=1}^{n} w_i^{t+1} = \sum_{i=1}^{n} w_i^{t+1}$, where $w_i^{t+1}$, is the weight of an attribute edge in iteration t+1, the weights of the attribute edges are redistributed as follows using Equations 5-7:

$$w_i^{t+1} = \frac{1}{2}(w_i^t + \delta w_i^t) \quad \text{Equation 5}$$

$$\delta w_i^t = \frac{\Theta_a}{\sum \Theta} \times W \quad \text{Equation 6}$$

$$W = \sum w^t \quad \text{Equation 7}$$

In various instances, then, in each iteration, the weights are adjusted towards the direction of increasing the modularity objective. Rewriting the modularity maximization (Equation 3) for this augmented graph model, results in Equations 3.1, 3.2, and 3.3:

$$Q = \frac{1}{2m}(Q_s + Q_d) \quad \text{Equation 3.1}$$

$$Q_s = \frac{1}{2m} \sum_{lk} \left[ A_{lk} - \frac{da(v_l) \times da(v_k)}{2m} \right] \delta(v_l, v_k) \quad \text{Equation 3.2}$$

-continued $$Q_d = \frac{1}{2m}\sum_{ij}\left[A_{ij} - \frac{da(v_i) \times da(v_j)}{2m}\right]\delta(v_i, v_j) \qquad \text{Equation 3.3}$$

where $v_l$, $v_k$ are vertices that belong to a same attribute center and $v_i$, $v_j$ are vertices that belong to different attribute centers. $\delta(\cdot, \cdot)$ is the same as in Equation 3, and its value is 1 if the two vertices are in the same community and 0 otherwise.

At block 226, computer system 100 evaluates the modularity increase of the modularity maximization. As discussed above, analyzing an augmented graph model using modularity maximization is performed such that each of the attributed nodes is grouped in the subset of recipient user accounts that maximizes modularity gain over entire the augmented graph model. In various instances, the modularity of an augmented graph model is in proportion to the sum of differences between connections and expected connections from every pair of vertices that are in a same community. In the above Equations 3.1, 3.2 and 3.3, $Q_s$ represents the sum of modularity calculated from the pairs of vertices in a same attribute clusters 124 and $Q_d$ represents the sum of modularity calculated from the pairs of vertices in different attribute clusters 124. Weight learning, however, affects the modularity of $Q_s$ more than $Q_d$ and as such the modularity of $Q_d$ changes to a lesser extent when weights are adjusted. In each iteration, each center point node will also be assigned to one of its member's communities according to its relationships with its members. When the weights of attribute relationships from an attribute cluster 124 are increased, $A_{lk}$ between the member vertices to the center point node representing the attribute cluster 124 also increased. In this way, $Q_s$ is increased more as most of vertices are likely to be assigned into the same community with the center point node for that attribute cluster 124. In contrast, when the weights of attribute relationships are decreased, $Q_d$ decreases less because most of the vertices connect to the center point node for the attribute cluster 124 are assigned into different communities.

Figure 4A:
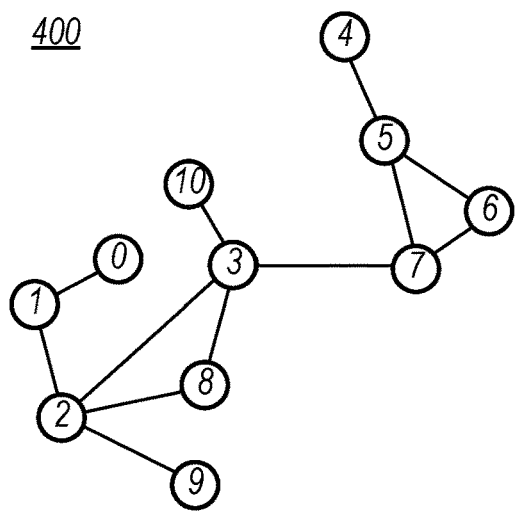
FIG. 4A-B are a series of pictures illustrating an exemplary process of nodes being grouped into subsets in accordance with the disclosed embodiments.
Figure 4A:
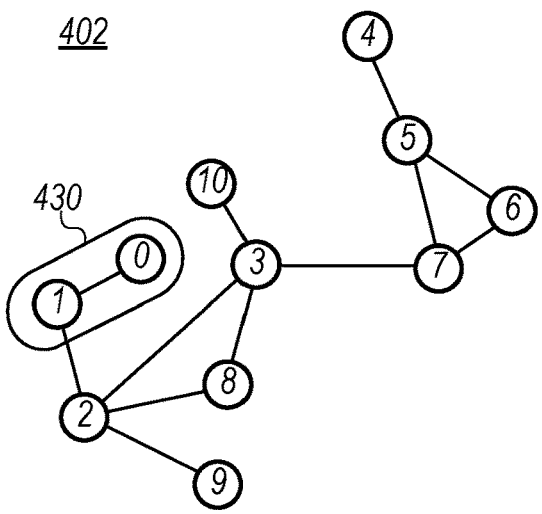
Figure 4A:
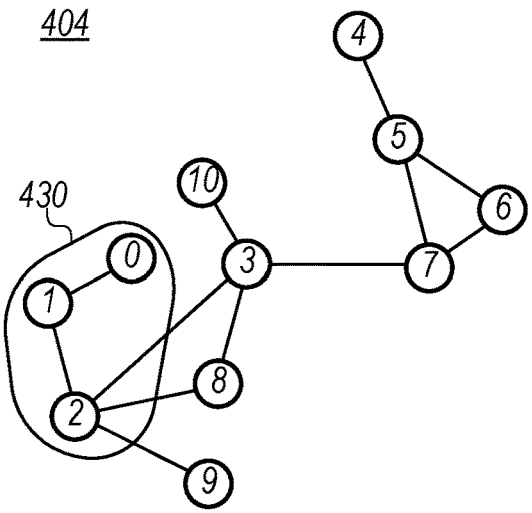
Figure 4A:
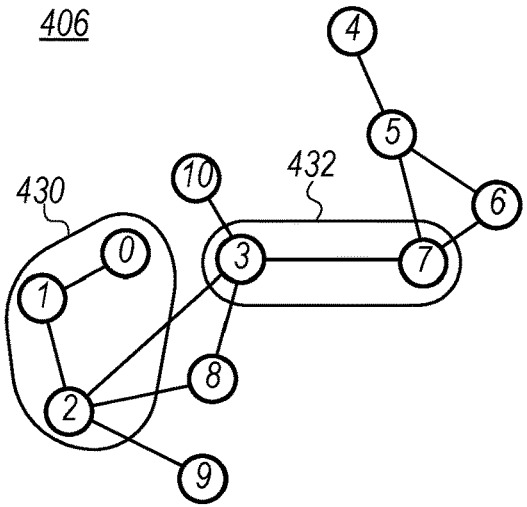
Figure 4A:
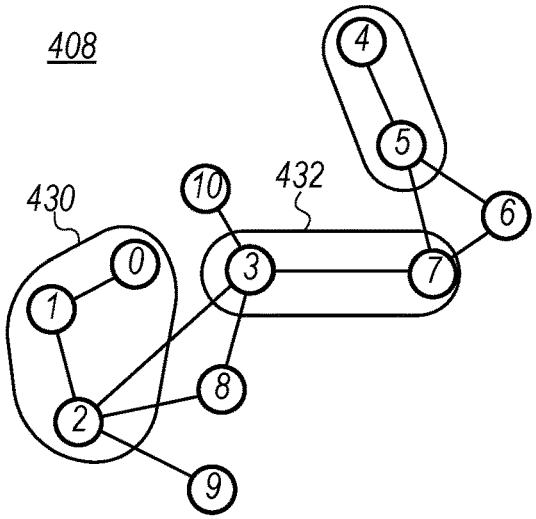
Figure 4A:
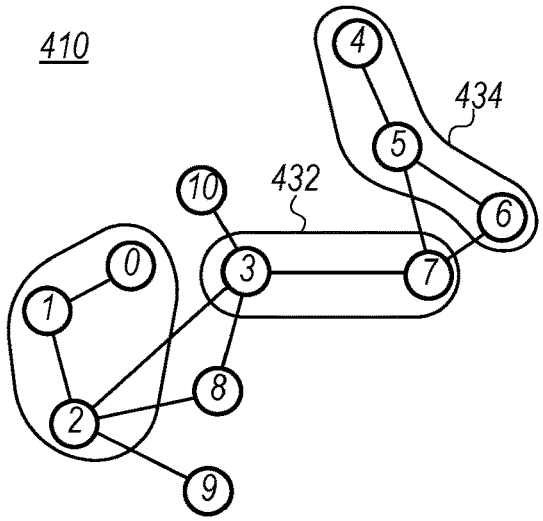
Figure 4B:
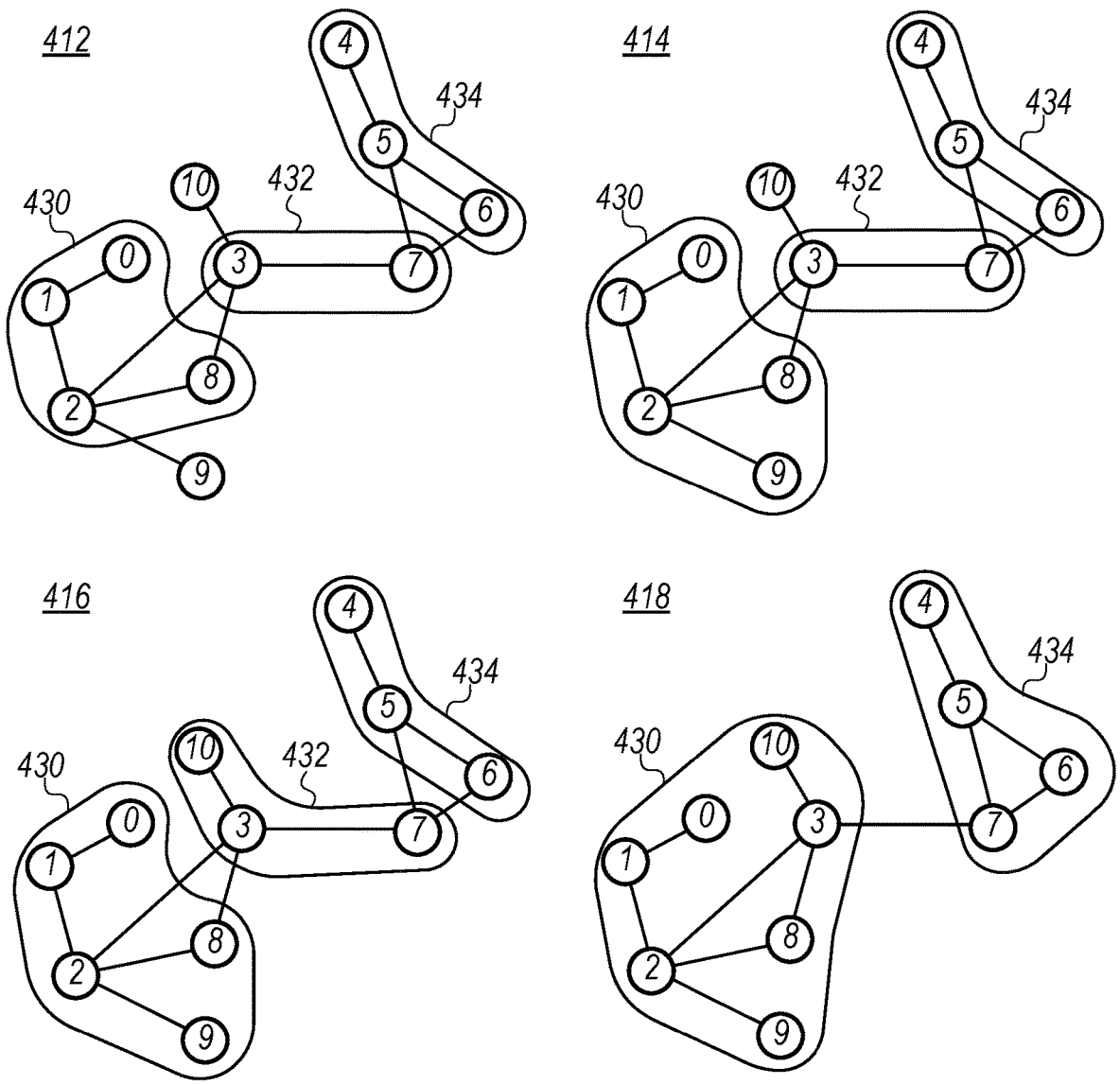

Referring now to FIG. 4A and 4B, a series of pictures illustrating an exemplary process of nodes being grouped into subsets in accordance with the disclosed embodiments is shown. In various embodiments, the nodes are grouped into communities using the modularity maximization techniques discussed herein in reference to modularity maximization phase 220 in FIG. 2.

In various embodiments, the modularity maximization phase 220 is a "greedy" algorithm in which in each stage/iteration the local optimum is selected with the intent of finding a global optimum. In embodiments, greedy modularity maximization reduces computation cost significantly, however, but the result is significantly affected by the order of processing. In such embodiments, to find the community assignments which maximize the global modularity of an augmented graph model, in each step, a vertex is assigned into one of its neighbors' communities. In such embodiments, then, a sub-task to finding a particular local optimal community assignment is to find optimal community assignments for previous n vertices. This recursion can be expressed as Equation 8:

$$Q[n]=\max(Q_1[n-1]+q_{n-1,n}, Q_2[n-2]+q_{n-2,n} \ldots) \qquad \text{Equation 8}$$

In Equation 8, the $Q_k[n-k]$ represents the optimal community assignments for previous n-k vertices while $q_{n-k,n}$ represents the later k vertices' assignments. However, in this greedy method, this recursion can be expressed with simplified Equation 8.1:

$$Q[n]=Q_1[n-1]+q_{n-1,n} \qquad \text{Equation 8.1}$$

The community assignment of a given vertex thus depends on the previous assignments. In some embodiments, for the application of modularity maximization used herein, it is assumed that the previous assignments for n-1 vertices are always the optimum solution even after the assignment of a given vertex being assigned. In various instances, however, this is not true and the assignments for initial vertices are not always reliable.

In various instances, during the first iteration through phase 220, when the first half of the vertices in an augmented graph model are processed, no information about the remaining vertices' community assignments may be known. That is, the greedy modularity maximization technique may take very limited information when processing most of vertices in the network. In various instances, this may generate different local optimums that are not globally optimal because global modularity would be greater for the model if the certain vertices were grouped in different communities. In following iterations, even when the community assignments of all of the vertices in the augmented graph model are known, these local optimums will not improve due to a "mutual effect." In an illustrative example, assume that vertices $v_b$ and $v_c$ are processed after vertex $v_a$, and that both are assigned into the same community with $v_a$ (thus $v_a$, $v_b$ and $v_c$ are in the same community). In subsequent iterations, when $v_a$'s community assignment is reevaluated, the community assignments of vertices $V_b$ and $v_c$ will affect vertex $v_a$'s community reassignment by keeping it from re-assigning to other communities (even when so doing would result in an increased global modularity). This kind of effect is referred to herein as a "mutual effect."

In various instances, this scenario happens frequently since the earlier the assignment of a vertex, the less information that can be used for that assignment. A single edge with a large weight can result in two vertices having locally optimal but not globally optimal assignments when the model does not have enough information. In a payment network, for example, one occasional transaction involving a large amount can result in the nodes for two merchants being grouped in the same locally optimal but not globally optimal community, and this less than optimal grouping can also affect further assignments of other vertices.

In FIGS. 4A-4B, the number on each vertex represents its order of processing. At step 400, each vertex is initialized to its own individual community. Then, according to the sequence of the order of processing, the community assignment of every vertex is compared to its neighbors' community assignments by modularity gain. At step 402, vertex $v_1$ is grouped with vertex $v_0$ into community 430. At step 404, vertex $v_2$ is also grouped into community 430. At step 406, vertex $v_3$ is grouped into community 432 with vertex $v_7$, even though vertex $v_3$ has neighbor vertices $v_2$, $v_8$ and $v_{10}$ in addition to $v_7$. At step 406, however, vertices $V_8$, $V_9$, and $v_{10}$ are in their individual communities because they have not been processed. In the ideal result, however, indicated by ground truth 418, vertices $v_8$, $v_9$, and $v_{10}$ are in community 430 with $v_2$ and $v_3$ according their connectivity. Thus in step 406, $v_3$ should also be assigned to community 430 for its dense connections with $v_2$, $v_8$, $v_9$, and $v_{10}$. But, the model does not have this information at step 406. At step 408, $v_4$ is grouped with $v_5$ into community 434. At step 410, $v_6$ is also grouped into community 434. At steps 412 and 414, $v_8$ and $v_9$ are, respectively, grouped into community 430. At step 416, vio is grouped into community 432 because of the influence of grouping $v_3$ and $v_7$ into community 432 at step 406. But, as discussed above, in the ground truth 418 there is no community 432, and therefore refinement of the grouping will improve the result as discussed below in reference to modularity refinement phase 230 in FIG. 2. Note that block 226 iterates back to block 222. After each iteration, the modularity will be compared with the value in the previous iteration. The learning algorithm converges once modularity increase stops in an iteration, and method 200 continues to phase 230.

In various embodiments, method 200 includes modularity refinement phase 230 in which the community assignments of various nodes are reevaluated. In various embodiments, modularity refinement phase 230 includes block 232. At block 232, computer system 100 performs modularity refinement to refine the community assignments from modularity maximization phase 220. In various embodiments, such modularity refinements include removing or minimizing the local optimums (that are not globally optimal) discussed herein by reassigning nodes to different subsets. During modularity refinement phase 230, computer system 100 reevaluates each attributed node according to the same sequence as used in phase 220 to determine whether any regrouping of the attributed nodes is warranted. During the reevaluating, the grouping of a given node is reevaluated without reference to the grouping of other attributed nodes that were previously grouped in the same subset, but which occur later in the sequence.

Completely getting rid of all of the local optimums that are not globally optimal means finding the optimum solution for a modularity maximization problem, which is np-hard and not practical in various embodiments. However, an effective greedy refinement can be performed to improve the result without expending as many computing resources. In such embodiments, the community assignments can be refined by giving each vertex a chance to reassign its community after all of the vertices have been assigned (e.g., after step 416 shown in FIG. 4B) with the mutual effect eliminated.

In refinement, all vertices' community assignments will be reevaluated in the same order from phase 220. When reevaluating a vertex $v_i$, $v_i$ will be compared with three types of neighbors: (i) a neighbor that has the same community assignment as $v_i$, assigned before $v_i$'s assignment, (ii) a neighbor that has same community assignment as $v_i$, assigned after $v_i$, and (iii) a neighbor that has a different community assignment from $v_i$.

During reevaluation of a given node $v_i$, the neighbors of that node that were assigned to the same community later in the sequence (i.e., used in phase 220) than $v_i$ are temporarily masked. In such instances, the masked vertices are those whose community assignments are directly affected by the current vertex $v_i$ in the greedy modularity maximization process. Additionally, in such instances, those vertices processed after $v_i$ but have different community assignments from $v_i$ are not masked. If $v_i$'s assignment is changed to one of its neighbors, say $v_n$'s assignment, because that represented that largest modularity gain, then there are two possible cases: (1) if $v_n$ is a masked neighbor, then $v_i$ keeps its original assignment, i.e., $v_i$'s community assignment is unchanged during the re-evaluation, or (2) if $v_n$ is not a masked neighbor, then $v_i$ will be re-assigned to $v_n$'s community.

Figure 5:
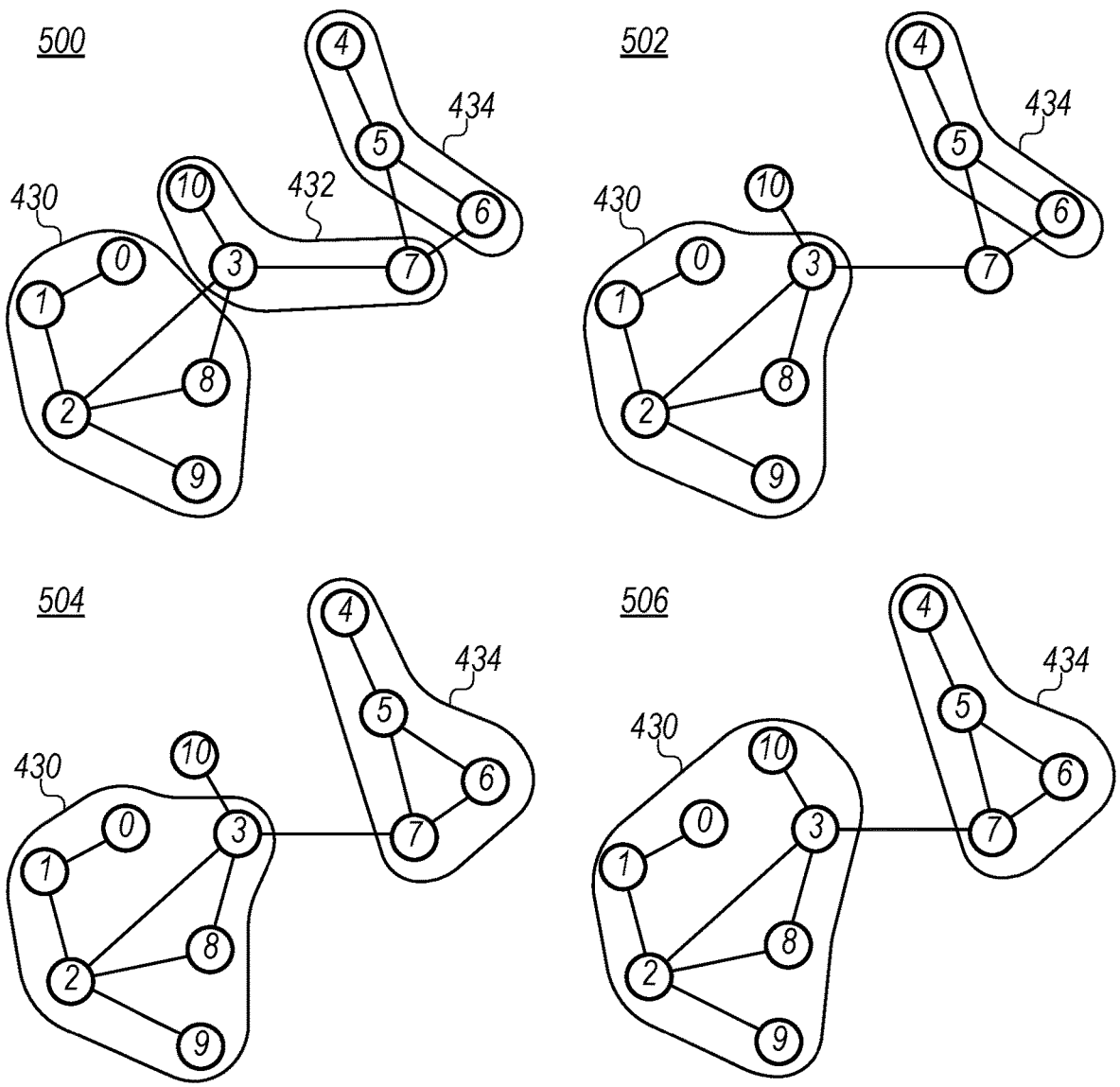
FIG. 5 is a series of pictures illustrating an exemplary process of nodes being regrouped into subsets in accordance with the disclosed embodiments.

Referring now to FIG. 5, a series of pictures illustrating an exemplary process of nodes being regrouped into subsets in accordance with the disclosed embodiments is shown. In various embodiments, the nodes are regrouped into communities using the modularity refinement techniques discussed herein in reference to modularity refinement phase 230 in FIG. 2. Referring back to FIG. 4B, in ground truth 418, vertices $v_3$ and $v_{10}$ belong to community 430, while vertex $v_7$ belongs to community 434. Referring again to FIG. 5, at step 500, the community assignments of all vertices from modularity maximization phase 220 are shown with vertex $v_3$ is assigned to a community with vertices $v_7$ and $v_{10}$. In step 502, when reevaluating vertex $v_3$, vertices $v_7$ and $v_{10}$ will be temporarily masked to individual communities, because they originally were processed after $v_3$. After the masking, the mutual effects between vertices $v_3$, $v_7$ and $v_{10}$ are eliminated. After re-evaluation, $v_3$ is reassigned to community 430 because joining into it produces larger modularity gain than joining either temporary community of $v_7$ or of $v_{10}$. Accordingly, the relationship between either $v_7$ or $v_{10}$ to $v_3$ is not strong enough to continue keeping $v_3$ in their communities once the mutual effect is eliminated. At step 504, $v_7$ is reassigned to community 434. Then, at step 506, $v_{10}$ is reassigned to community 430. Accordingly, the result of modularity refinement phase 230 shown in FIG. 5 more closely matches ground truth 418 shown in FIG. 4B than the result of modularity maximization phase 220. Thus, in modularity refinement phase 230, the mutual effect is eliminated but other information in the graph is retained. Accordingly, if a vertex is reassigned to one of those masked neighbors' community again, it indicates these vertices have sufficiently strong relationships to group them in the same community.

In various embodiment, the techniques described herein are used to generate an augmented graph model of a network of transactions between buyers and sellers made over a payment service. In such embodiments, the augmented graph includes nodes representing buyers, nodes representing sellers, and center point nodes representing attribute clusters associated with various sellers, as discussed herein. In such embodiments, nodes representing buyers are connected to nodes representing sellers by edges to represent transactions, and center point nodes for the attributed cluster are connected to buyer nodes grouped in the respective attribute cluster by attribute edges. Using the techniques disclosed herein, the augmented graph model can be analyzed to identify one or more communities from among the buyers using the topological information from the augmented graph model as well as the attribute information represented in the model using the center point nodes and attribute edges. In a simplified example, and referring again to FIGS. 4A and 4B, using the techniques disclosed herein, nodes representing various sellers are grouped into communities 430, 432, and 434. As discussed herein, however, grouping nodes $v_3$, $v_7$, and $v_{10}$ together is locally optimal based on incomplete information during phase 220 (of FIG. 2), but this grouping is not the globally optimal result. As discussed herein, this may be because particularly large transactions involving $v_3$ and $v_7$ initially suggest that these two nodes should be grouped together, but additional analysis would show that this result is not globally optimal but for the mutual effect between the two nodes. Referring now to FIG. 5, however, the grouping is refined in phase 230 (of FIG. 2) such that when the mutual effect is removed, $v_3$ and $v_{10}$ are grouped in community 430 and $v_7$ is grouped into community 434. Then, in various embodiments, these community groupings can be used to the benefit of the payment service (e.g., by identifying security risks associated with a certain community, by identifying transactions that might involve contraband, etc.) as discussed herein.

Complexities in Attribute Information

In various embodiments, attribute values set 112 includes information stored in various different data types. For example, a merchant's business region is a categorical value while its payment volume is numerical. Clustering on attributes with mixed types is challenging, and is incompatible with various clustering techniques.

In addition to mixed data types, attribute values set 112 may include additional special data types that are unable to be processed directly by traditional data processing algorithms in various instance. One such special data type is the "many-value categorical attribute," and another is the "multi-value categorical attribute." As used herein, "many-value categorical attributes" are attributes that contain a large cardinality of values. For example, the value of a "country code" attribute may contain more than one hundred country codes. Using hot encoding on this type of attribute leads to sparse latent dimensions which decreases clustering performance. As used herein, "multi-value categorical attributes" refer to attributes that contain multiton values (as opposed to singleton values). One example is an attribute "product bundle". Each value of this attributed is a set of singleton values such as product A, product B. In various embodiments, these special data types are specially handled before they are used for clustering.

In various embodiments, however, the disclosed techniques are flexible enough to adapt different methods for attribute clustering. For example, in various embodiments a k-prototype algorithm is used to cluster attributes and construct the augmented graph. In such embodiments, k-prototype extends the k-means clustering algorithm and is efficient for clustering large data sets with mixed attribute types. The k-prototype algorithm clusters data against k prototypes instead of k means. Each prototype is represented by a vector which is a combination of numerical attributes and categorical attributes. In each iteration, k-prototype updates numerical attributes by their means while updating categorical attributes by their modes. In k-prototype, the distance between a vertex $v_i$ and a prototype $v_p$ is defined by Equation 9:

$$d(v_i, v_p) = \sum_{j=1}^{m_r}(v_{ij}^r - v_{pj}^r)^2 + \gamma \sum_{j=1}^{m_c} \delta(v_{ij}^c, v_{pj}^c) \qquad \text{Equation 9:}$$

In Equation 9, $m_r$ is the number of numerical attributes, $v_{ij}^r$ and $v_{pj}^r$ are values of a numeric attribute of $v_i$ and $v_p$, respectively. $m_c$ is the number of categorical attributes and $v_{ij}^c$ and $v_{pj}^c$ are values of a categorical attribute. $\gamma$ is a weight balancing the two types of attributes: $\delta(v_{ij}^c, v_{pj}^c)=0$ if $v_{ij}^c = v_{pj}^c$ and $\delta(v_{ij}^c, v_{pj}^c)=1$ otherwise Because, however, in various embodiments the set of information specifying attribute information is complex in various ways, attribute values are normalized in various embodiments to retain categorical value distribution and to handle multi-value and many-value categorical attributes. In such embodiments, (a) numerical attributes are normalized by z-score normalization; (b) categorical attributes (excluding multi-value and many-value attributes), are encoded by one hot encoder and normalized by z-score normalization; and/or (c) for multi-value and many-value categorical attributes, each singleton value is normalized by z-score normalization and stored as a (categorical value, z-score) pair and each multi-value attribute is stored as a set of key-value pairs.

The distance between a vertex $v_i$ and a prototype $v_p$ is redefined as Equation 10:

$$d(v_i, v_p) = \sum_{j=1}^{m_r}\|(v_{ij}^{\hat{r}} - v_{pj}^{\hat{r}})\| + \sum_{j=1}^{m_c}\|(v_{ij}^{\hat{c}} - v_{pj}^{\hat{c}})\|\delta(v_{ij}^c, v_{pj}^c) + \qquad \text{Equation 10}$$

$$\sum_{j=1}^{m_u} J(v_i^{\hat{u}}, v_p^{\hat{u}}) + \sum_{j=1}^{m_a}\|(v_{ij}^{\hat{a}} - v_{pj}^{\hat{a}})\|\delta(v_{ij}^a, v_{pj}^a)$$

In Equation 10, ^ denotes normalized values, $v^u$ is a value of a multi-value attribute and $v^a$ represents a value of many-value attribute. With respect to the original distance, the difference of normalized values between two categorical values to represent their distance is used, instead of 1.

For multi-value attributes, each value is a set of key-value pairs. The distance between these vertexes is calculated using weighted Jaccard distance J in Equation 11.

$$J(\hat{v}_i, \hat{v}_p) = 1 - \frac{\sum_{x \in \hat{v}_i \cap \hat{v}_p} w(x)}{\sum_{y \in \hat{v}_i \cup \hat{v}_p} w(y)} \qquad \text{Equation 11}$$

Here w(x) is the normalized value of x. The weighted Jaccard distance J, with values in the range of [0,1], measures the dissimilarity between two multi-value attributes.

In various embodiments, the original k-prototype algorithm updates a categorical attribute of a prototype in two steps: (i) calculate the frequency for all categories, and (ii) assign the prototype the category with highest frequency.

This updating scheme can be directly extended to many-value attributes and multi-value attributes. For multi-value attribute, the value of a prototype is a set of singleton values. For example, given 4 attributes, each has its 4, 5, 4, 3 singleton values respectively, listed in a column as shown here:

$$\begin{bmatrix} c_{1,1} & c_{2,1} & c_{3,1} & c_{4,1} \\ c_{1,2} & c_{2,2} & c_{3,2} & c_{4,2} \\ c_{1,3} & c_{2,3} & c_{3,3} & c_{4,3} \\ c_{1,4} & c_{2,4} & c_{3,4} & \\ & c_{2,5} & & \end{bmatrix}$$

If k is 3, 3 prototypes with 4 multi-value attributes can be assigned as:
p1={{c1,1, c1,3}, {c2,1, c2,2}, {c3,2}, {c4,1, c4,3}},
p2={{c1,2}, {c2,3, c2,4}, {c3,2}, {c4,2}},
p3={{c1,4}, {c2,2}, {c3,3, c3,4}, {c4,3}}

In various embodiments, a singleton value is considered frequent if it is shared by majority vertices in a cluster. Based on this intuition, multi-value attribute can be updated in two steps: (i) calculate frequencies for all singleton values of one multi-value attribute, and (ii) assign to the prototype the set of singleton values where each value is shared by more than half vertices in the cluster. In other words, when a value is shared by more than half of vertices in a cluster, it will be updated to the prototype because it is considered a common feature to that cluster.

Figure 6:
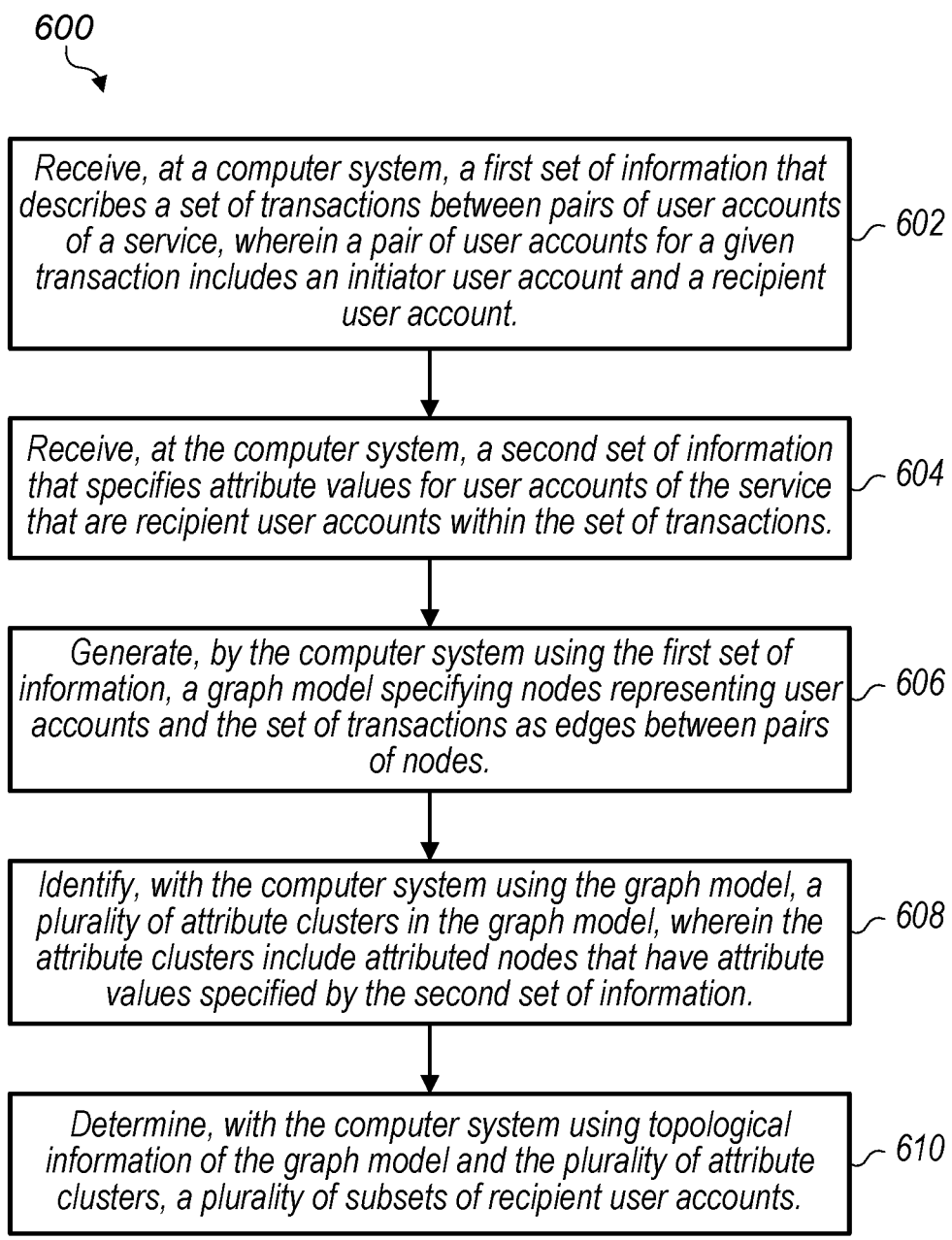
FIG. 6 is flowchart illustrating an embodiment of a user account subset determining method in accordance with the disclosed embodiments.
Figure 7:
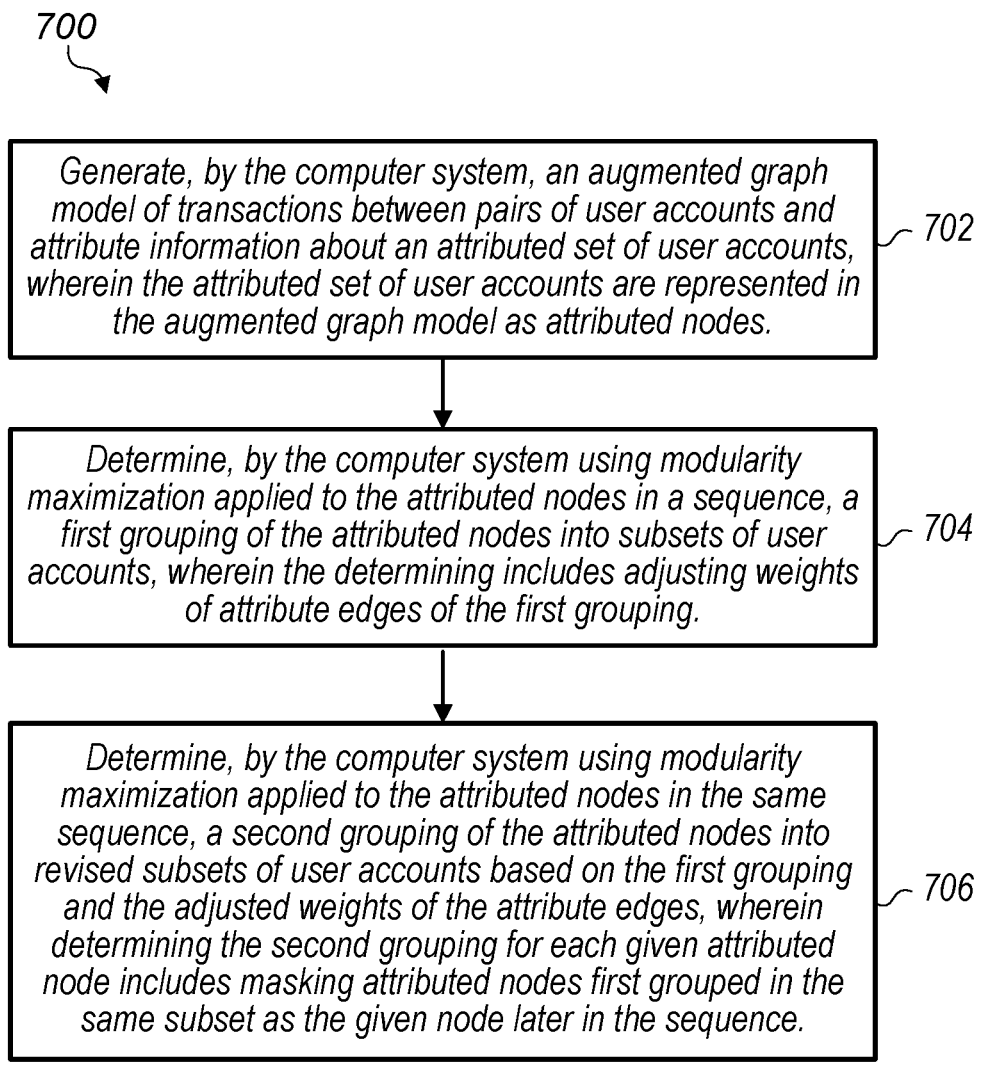
FIG. 7 is flowchart illustrating an embodiment of a user account subset determining method in accordance with the disclosed embodiments.

FIGS. 6 and 7 illustrate various flowcharts representing various disclosed methods implemented with computer system 100. Referring now to FIG. 6, a flowchart depicting a user account subset determining method 600 is depicted. In the embodiment shown in FIG. 6, the various actions associated with method 600 are implemented by computer system 100. At block 602, computer system 100 receives a first set of information set (e.g., transaction set 110) that describes a set of transactions between pairs of user accounts of a service. A pair of user accounts for a given transaction includes an initiator user account and a recipient user account. At block 604, computer system 100 receives a second set of information (e.g., attribute values set 112) that specifies attribute values for user accounts of the service that are recipient user accounts within the set of transactions. At block 606, computer system 100 generates a graph model specifying nodes representing user accounts and the set of transactions as edges between pairs of nodes as discussed herein in connection to phase 210 of FIG. 2. At block 608, computer system 100 identifies, using the graph model, a plurality of attribute clusters 124 in the graph model as discussed herein in connection to phase 210 of FIG. 2 and FIG. 3. The attribute clusters include attributed nodes that have attribute values specified by the second set of information. At block 610, computer system 100 determines, using topological information of the graph model and the plurality of attribute clusters, a plurality of subsets of recipient user accounts as discussed herein in connection to phases 220 and 230 of FIG. 2 and the various steps of FIGS. 4A, 4B, and 5.

Referring now to FIG. 7, a flowchart depicting a user account subset determining method 700 is depicted. In the embodiment shown in FIG. 7, the various actions associated with method 700 are implemented by computer system 100. At block 702, computer system 100 generates an augmented graph model of transactions between pairs of user accounts and attribute information about an attributed set of user accounts as discussed herein in connection to phase 210 of FIG. 2 and FIG. 3. The attributed set of user accounts are represented in the augmented graph model as attributed nodes. At block 704, computer system 100 determines, using modularity maximization applied to the attributed nodes in a sequence, a first grouping of the attributed nodes into subsets of user accounts as discussed herein in connection to phase 220 of FIG. 2 and the various steps of FIG. 4A and 4B. This determining includes adjusting weights of attribute edges of the first grouping. At block 706, computer system 100 determines, modularity maximization applied to the attributed nodes in the same sequence, a second grouping of the attributed nodes into revised subsets of user accounts based on the first grouping and the adjusted weights of the attribute edges as discussed herein in connection to phase 230 of FIG. 2 and the various steps of FIG. 5. This determining of the second grouping for each given attributed node includes masking attributed nodes first grouped in the same subset as the given node later in the sequence.

Exemplary Computer System

Figure 8:
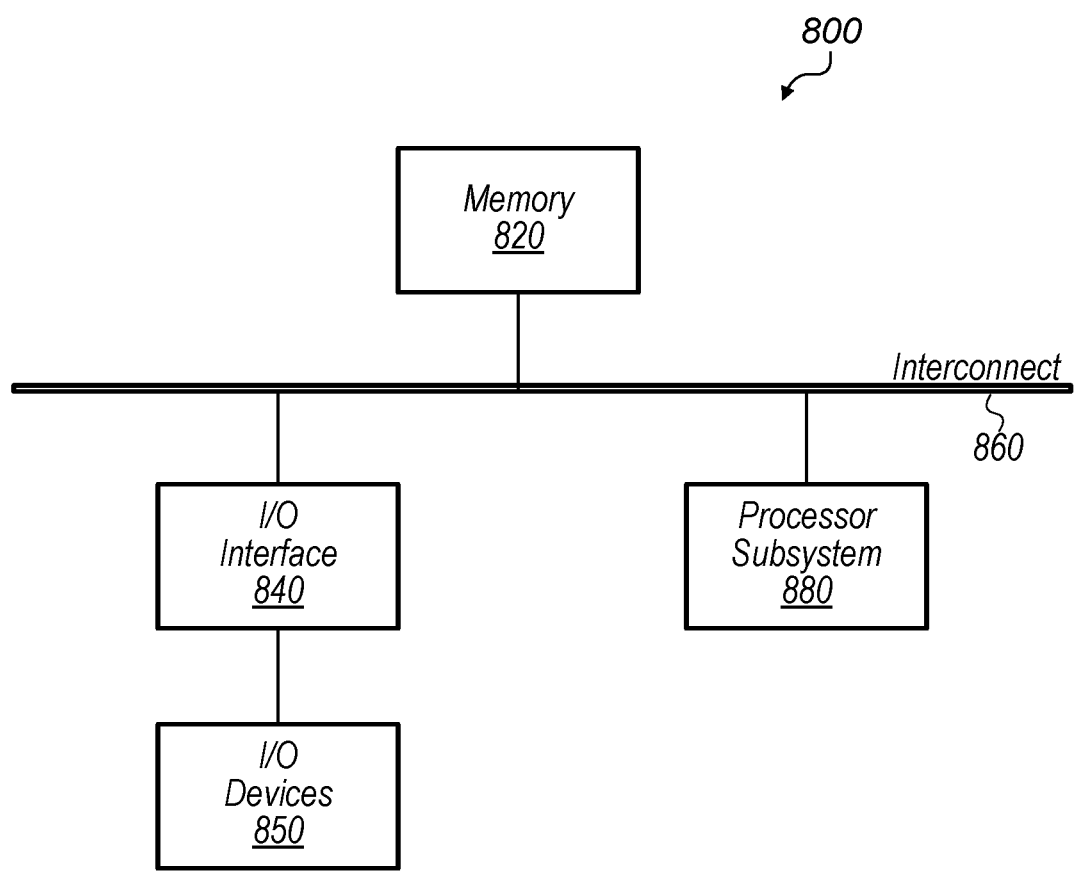
FIG. 8 is a block diagram of an exemplary computer system, which may implement the various components of FIG. 1.

Turning now to FIG. 8, a block diagram of an exemplary computer system 800, which may implement the various components of computer system 100 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer system comprising:
a computer processor circuit; and
a computer-memory storing instructions executable by the computer processor circuit to cause the computer system to perform operations including:
receiving, at the computer system, a first set of information that describes a set of transactions between pairs of user accounts of a computer-implemented service, wherein a pair of user accounts for a given transaction includes an initiator user account and a recipient user account;
receiving, at the computer system, a second set of information that specifies a set of attribute values for user accounts of the service that are recipient user accounts within the set of transactions;
generating, by the computer system using the first set of information, a graph model representing user accounts as nodes and the set of transactions as edges between pairs of nodes, wherein the graph model includes at least one million nodes;
identifying, with the computer system, a plurality of attribute clusters within the set of attribute values specified by the second set of information, wherein the attribute clusters include attributed nodes that have attribute values specified by the second set of information;
creating an augmented graph model by inserting, for a given attribute cluster among a group of the attribute clusters, an additional node into the graph model and connecting, with weighted attribute edges, the additional node to attributed nodes in the given attribute cluster, wherein the additional node represents the attribute values of the attributed nodes clustered in the given attribute cluster;
determining, with the computer system using topological information of the augmented graph model having the additional nodes corresponding to the attribute clusters in the group, a plurality of subsets of recipient user accounts; and
managing, by the computer system, an aspect of the computer-implemented service using the determined plurality of subsets of recipient user accounts.

2. The computer system of claim 1, wherein the operations further include:
based on determining a particular subset of the plurality of subsets of recipient user accounts, flagging recipient user accounts in the particular subset for review.

3. The computer system of claim 1, wherein the operations further include:
based on determining a particular subset of the plurality of subsets of recipient user accounts, sending messages to recipient user accounts in the particular subset.

4. The computer system of claim 1, wherein the operations further include:
assigning, with the computer system, respective risk scores to one or more of the subsets of recipient user accounts; and
evaluating, with the computer system, transactions associated with a particular subset of recipient user accounts based on a risk score for the particular subset.

5. The computer system of claim 1, wherein identifying a plurality of attribute clusters includes:
determining a number of attribute clusters; and
clustering attributed nodes into the number of attribute clusters in a manner that reduces variance between the attributed nodes in a given cluster; and
wherein inserting an additional node into the graph model includes:
identifying a center point of each attribute cluster; and
representing the center point of each attribute cluster in the graph model using the additional node.

6. The computer system of claim 1, wherein determining the plurality of subsets of recipient user accounts includes applying modularity maximization to the graph model such that each of the attributed nodes is grouped in the subset of recipient user accounts that maximizes modularity gain over an entirety of the graph model.

7. The computer system of claim 1, wherein determining the plurality of subsets of recipient user accounts includes:
initially grouping each attributed node into its own subset;
evaluating, according to a sequence of attributed nodes, each attributed node to determine whether to group the attributed node and its closest neighboring attributed node in the same subset; and
subsequently reevaluating each attributed node according to the sequence to determine whether any regrouping of the attributed nodes is warranted, wherein during the reevaluating, grouping of a given node is performed without reference to the grouping of other attributed nodes that were previously grouped in the same subset, but which occur later in the sequence.

8. The computer system of claim 1, wherein each transaction represented by the graph model includes a buyer user account acting as an initiator user account and a seller user account acting as a recipient user account.

9. The computer system of claim 1,
wherein the second set of information includes many-value categorical attributes, multi- value categorical attributes, or both; and
wherein identifying the plurality of attribute clusters in the graph model includes normalizing the many-value categorical attributes and multi-value categorical attributes by z-score normalization.

10. A method comprising:
receiving, at a computer system, a first set of information that describes a set of transactions between pairs of user accounts of a computer-implemented service, wherein a pair of user accounts for a given transaction includes an initiator user account and a recipient user account;
receiving, at the computer system, a second set of information that specifies attribute values for user accounts of the service that are recipient user accounts within the set of transactions;
generating, by the computer system and using the first set of information and second set of information, an augmented graph model of the set of transactions and attribute values, wherein the augmented graph model includes at least one million nodes, wherein the augmented graph model has been augmented with respective additional nodes inserted into an original graph model, wherein a given additional node corresponds to a respective attribute cluster and is connected to attributed nodes in the respective attribute cluster, wherein a given additional node represents the attribute values of the attributed nodes clustered in a given attribute cluster; and
determining, with the computer system by applying modularity maximization to the augmented graph model, a plurality of subsets of recipient user accounts, wherein the determining is based on topological information of the augmented graph model and the additional nodes corresponding to the respective attribute clusters.

11. The method of claim 10, wherein the second set of information includes many-value categorical attributes, multi-value categorical attributes, or both; and
   wherein generating the augmented graph model includes normalizing the many-value categorical attributes and multi-value categorical attributes by z-score normalization.

12. The method of claim 10, further comprising:
   assigning, with the computer system, respective risk scores to one or more of the subsets of recipient user accounts; and
   evaluating, with the computer system, transactions associated with a particular subset of recipient user accounts based on a risk score for the particular subset.

13. The method of claim 10, further comprising:
   based on determining a particular subset of the plurality of subsets of recipient user accounts, flagging recipient user accounts in the particular subset as security risks, compliance risks, or both.

14. The method of claim 10, wherein generating the augmented graph model includes:
   determining a number of attribute clusters in the original graph model;
   clustering attributed nodes representing recipient user accounts for which the second set of information specifies attribute values into the number of attribute clusters so as to minimize variance between the attributed nodes in a given cluster;
   identifying a center point of each attribute cluster;
   representing the center point of each respective attribute cluster in the augmented graph model using the respective additional node; and
   for each attribute cluster, connecting each of the clustered attributed nodes to the respective additional node corresponding to the attribute cluster with an attribute edge having an attribute edge weight.

15. The method of claim 14, further comprising:
   for one or more respective attribute clusters, calculating a contribution score for the respective attribute clusters, wherein the contribution score is indicative of a contribution of a given attribute cluster to the determining of the plurality of subsets of recipient user accounts relative to other attribute clusters; and
   wherein applying modularity maximization to the augmented graph model includes adjusting the attribute edge weights for attributed nodes connected to a particular center point node according to a contribution score for the particular center point node.

16. The method of claim 10, wherein determining the plurality of subsets of recipient user accounts includes:
   initially grouping each attributed node into its own subset;
   evaluating, according to a sequence of attributed nodes, each attributed node to determine whether to group the attributed node and its closest neighboring attributed node in the same subset; and
   subsequently reevaluating each attributed node according to the sequence to determine whether any regrouping of the attributed nodes is warranted, wherein during the reevaluating, grouping of a given node is performed without reference to the grouping of other attributed nodes that were previously grouped in the same subset, but which occur later in the sequence.

17. The method of claim 10, wherein a given initiator user account is a transferor user account, a given recipient user account is a transferee user account, and each transaction corresponds to a transfer of one or more files from a transferor user account to a transferee user account.

18. A non-transitory, computer-readable medium storing instructions that when executed by a computer system cause the computer system to perform operations comprising:
   generating an augmented graph model representative of transactions between pairs of user accounts and attribute information about an attributed set of user accounts, wherein the attributed set of user accounts are represented in the augmented graph model as attributed nodes, wherein the augmented graph model has at least one million nodes and has been augmented with respective additional nodes inserted into an original graph model, wherein a given additional node corresponds to a respective attribute cluster and is connected to attributed nodes in the respective attribute cluster, and wherein a given additional node represents the attribute information of attributed nodes clustered in a given attribute cluster and is connected to respective attributed nodes in the given attribute cluster by respective attribute edges;
   determining, using modularity maximization applied to the attributed nodes in a sequence, a first grouping of the attributed nodes into subsets of user accounts, wherein the determining includes adjusting weights of the attribute edges of the first grouping; and
   determining, using modularity maximization applied to the attributed nodes in the same sequence, a second grouping of the attributed nodes into revised subsets of user accounts based on the first grouping and the adjusted weights of the attribute edges, wherein determining the second grouping for a given attributed node includes masking attributed nodes first grouped in the same subset as the given attributed node later in the sequence.

19. The computer-readable medium of claim 18,
   wherein user accounts are represented as nodes of the augmented graph model and transactions between user accounts are represented as edges between the nodes; and
   wherein the operations further comprise:
      assigning respective risk scores to one or more of the revised subsets of user accounts; and
      evaluating transactions associated with a particular revised subset of user accounts based on a risk score for the particular revised subset.

20. The computer-readable medium of claim 18, wherein adjusting weights of the attribute edges of the first grouping includes:
   for each respective additional node, calculating a contribution score for the respective additional node, wherein a given contribution score is indicative of a contribution of a given additional node to the determining the first grouping of subsets of recipient user accounts relative to other additional nodes.

* * * * *